(12) United States Patent
Ketterer et al.

(10) Patent No.: US 11,092,089 B1
(45) Date of Patent: Aug. 17, 2021

(54) VARIABLE COMPRESSION RATIO ENGINE CONTROL STRATEGY

(71) Applicant: GM GLOBAL TECHNOLOGY OPERATIONS LLC, Detroit, MI (US)

(72) Inventors: Justin E. Ketterer, LaSalle (CA); Ryan M. Heinbuch, Commerce Township, MI (US); Nathan M. Picot, Farmington Hills, MI (US); Craig E. Slepicka, Wixom, MI (US); Pulasti Bandara, Clinton Township, MI (US); Christopher E. Whitney, Commerce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/916,848

(22) Filed: Jun. 30, 2020

(51) Int. Cl.
| | | |
|---|---|---|
| *F02D 15/02* | (2006.01) | |
| *F02D 41/24* | (2006.01) | |
| *F02F 1/24* | (2006.01) | |
| *F02F 7/00* | (2006.01) | |
| *F02F 3/00* | (2006.01) | |
| *F02D 41/00* | (2006.01) | |
| *F01L 1/047* | (2006.01) | |
| *F02D 41/38* | (2006.01) | |
| *F02B 37/22* | (2006.01) | |
| *F02P 5/153* | (2006.01) | |

(Continued)

(52) U.S. Cl.
CPC .............. *F02D 15/02* (2013.01); *F01L 1/047* (2013.01); *F02B 37/22* (2013.01); *F02B 75/045* (2013.01); *F02D 13/0234* (2013.01); *F02D 41/0007* (2013.01); *F02D 41/009* (2013.01); *F02D 41/2406* (2013.01); *F02D 41/38* (2013.01); *F02F 1/24* (2013.01); *F02F 3/00* (2013.01); *F02F 7/0002* (2013.01); *F02P 5/153* (2013.01); *F02D 2041/389* (2013.01); *F02D 2200/024* (2013.01); *F02D 2200/101* (2013.01)

(58) Field of Classification Search
CPC .............. F02D 15/02; F16C 7/06; F16C 3/28
USPC ....................... 123/294, 48 A, 48 B
See application file for complete search history.

(56) References Cited

U.S. PATENT DOCUMENTS

| 8,794,200 B2 | 8/2014 | Jacques et al. |
| 10,428,863 B2 | 10/2019 | Zandeh |

(Continued)

*Primary Examiner* — Mahmoud Gimie
(74) *Attorney, Agent, or Firm* — Quinn IP Law

(57) ABSTRACT

A method of selecting a compression ratio in an internal combustion engine having a mechanism configured to vary the compression ratio includes receiving, via an electronic controller, a requested output torque value. The method also includes determining, via the controller, a value of engine speed corresponding to the requested output torque value. The method additionally includes determining, via the controller, a compression ratio value corresponding to the requested output torque value and the determined value of the engine speed. The method also includes determining, via the controller, a position of the mechanism corresponding to the determined compression ratio value. Furthermore, the method includes commanding, via the controller, the determined position of the mechanism and thereby selecting the determined compression ratio value. A vehicle employing a variable compression ratio internal combustion engine and an electronic controller configured to operate the engine according to the method is also disclosed.

16 Claims, 5 Drawing Sheets

(51) Int. Cl.
*F02D 13/02* (2006.01)
*F02B 75/04* (2006.01)

(56) References Cited

U.S. PATENT DOCUMENTS

| | | |
|---|---|---|
| 10,519,880 B2 | 12/2019 | Pisu et al. |
| 2011/0005496 A1* | 1/2011 | Hiraya ................... F02D 39/08 123/48 B |
| 2017/0218861 A1* | 8/2017 | Takeuchi ................ F02D 23/00 |
| 2019/0048842 A1* | 2/2019 | Oryoji ................... F02D 41/401 |

* cited by examiner

VARIABLE COMPRESSION RATIO ENGINE CONTROL STRATEGY

TECHNICAL FIELD

The present disclosure relates to a control strategy for an internal combustion engine with variable compression ratio.

An internal combustion engine is a heat engine in which the combustion of a fuel occurs with an oxidizer (typically air) in a combustion chamber that is an integral part of the engine. Internal combustion engines are often employed for powering vehicles, either as a primary power source, or as part of a hybrid powertrain. In a reciprocating internal combustion engine, expansion of the high-temperature and high-pressure gases in a combustion chamber space at the top of the cylinder produced by the combustion applies direct force to the engine's piston. The combustion force applied to the piston subsequently acts through the engine's connecting rod to turn the engine's crankshaft.

A compression ratio is one of the fundamental specifications of an internal combustion engine. An internal combustion engine's compression ratio is a value that represents the ratio of the volume of the engine's combustion chamber from its largest capacity to its smallest capacity. In a reciprocating internal combustion engine the compression ratio is typically defined as the ratio between the volume of the cylinder and combustion chamber when the piston is at the bottom of its stroke, and the volume of the combustion chamber when the piston is at the top of its stroke. An internal combustion engine's compression ratio greatly influences the subject engine's torque output and its fuel efficiency.

SUMMARY

One embodiment of the disclosure is directed to a method of selecting a compression ratio in an internal combustion engine having a mechanism configured to vary the compression ratio. The method includes receiving, via an electronic controller, a requested output torque value. The method also includes determining, via the electronic controller, a value of engine speed corresponding to the requested output torque value. The method additionally includes determining, via the electronic controller, a compression ratio value corresponding to the requested output torque value and the determined value of the engine speed. The method also includes determining, via the electronic controller, a position of the mechanism corresponding to the determined compression ratio value. The method additionally includes commanding, via the electronic controller, the determined position of the mechanism and thereby selecting the determined compression ratio value. Furthermore, the method includes commanding, via the electronic controller, a position of the mechanism and thereby selecting the determined compression ratio value.

Determining the compression ratio value corresponding to the requested output torque value and the determined value of the engine speed may include accessing a look-up table, for example stored in a memory of the electronic controller.

The engine may additionally include an engine block defining a cylinder, a cylinder head mounted to the engine block and defining at least a part of a combustion chamber, and a reciprocating piston arranged inside the cylinder and configured to compress a mixture of air and fuel and receive a combustion force. In such an engine, the mechanism includes a six-bar linkage configured to operatively connect the piston to the engine block, articulate on seven distinct parallel axes, and continuously and selectively vary the compression ratio of the engine. Additionally, in such an engine, commanding the position of the mechanism and selecting the determined compression ratio value may include shifting position of the six-bar linkage relative to the engine block.

The mechanism may additionally include a phasing actuator. In such an embodiment, shifting the position of the six-bar linkage may be accomplished via the phasing actuator.

The method may also include determining, via the electronic controller, actual compression ratio value following selecting of the position of the mechanism to affect the determined compression ratio value.

The method may additionally include determining, via the electronic controller, a difference between the determined compression ratio value and the actual compression ratio value. The method may further include commanding, via the electronic controller, the phasing actuator to shift the six-bar linkage relative to the engine block to minimize the determined difference between the determined compression ratio value and the actual compression ratio value.

Determining the difference between the determined compression ratio value and the actual compression ratio value may include determining a phase angle of the six-bar linkage relative to the crankshaft, and determining a rate of shift of the six-bar linkage via the phasing actuator required to achieve the phase angle. In such an embodiment, commanding the phasing actuator to shift the six-bar linkage relative to the engine block to minimize the determined difference may include commanding the determined rate of shift of the six-bar linkage to achieve the determined phase angle and thereby generate the requested output torque value.

The method may also include detecting output torque via a sensor and communicating the detected output torque to the electronic controller. The method may additionally include determining a difference between the detected output torque and the requested output torque value. The method may further include commanding the phasing actuator to shift the six-bar linkage relative to the engine block to minimize the determined difference between the detected output torque and the requested output torque value.

The engine may additionally include at least one of a throttle configured to regulate an amount of air admitted into the engine, an intake air compressor, an intake valve operated via a camshaft and configured to regulate an amount of air admitted into the combustion chamber, a fuel injector, and a spark plug configured to generate a spark to initiate combustion inside the combustion chamber. In such an embodiment, the method may further include regulating, via the electronic controller, at least one corresponding combustion parameter of the engine selected from a list including 1) a position of the throttle; 2) an amount of boost generated by the air compressor; 3) the timing of operation of the intake valve by phasing the camshaft; 4) an amount of fuel injected into the combustion chamber by the fuel injector; and 5) regulating a timing of the spark generated by the spark plug.

Selecting the determined compression ratio value may be accomplished in parallel with or prior to regulating the combustion parameters of the engine.

Another embodiment of the present disclosure is directed to a vehicle employing a variable compression ratio (VCR) internal combustion engine and an electronic controller configured to operate the VCR engine according to the above method.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
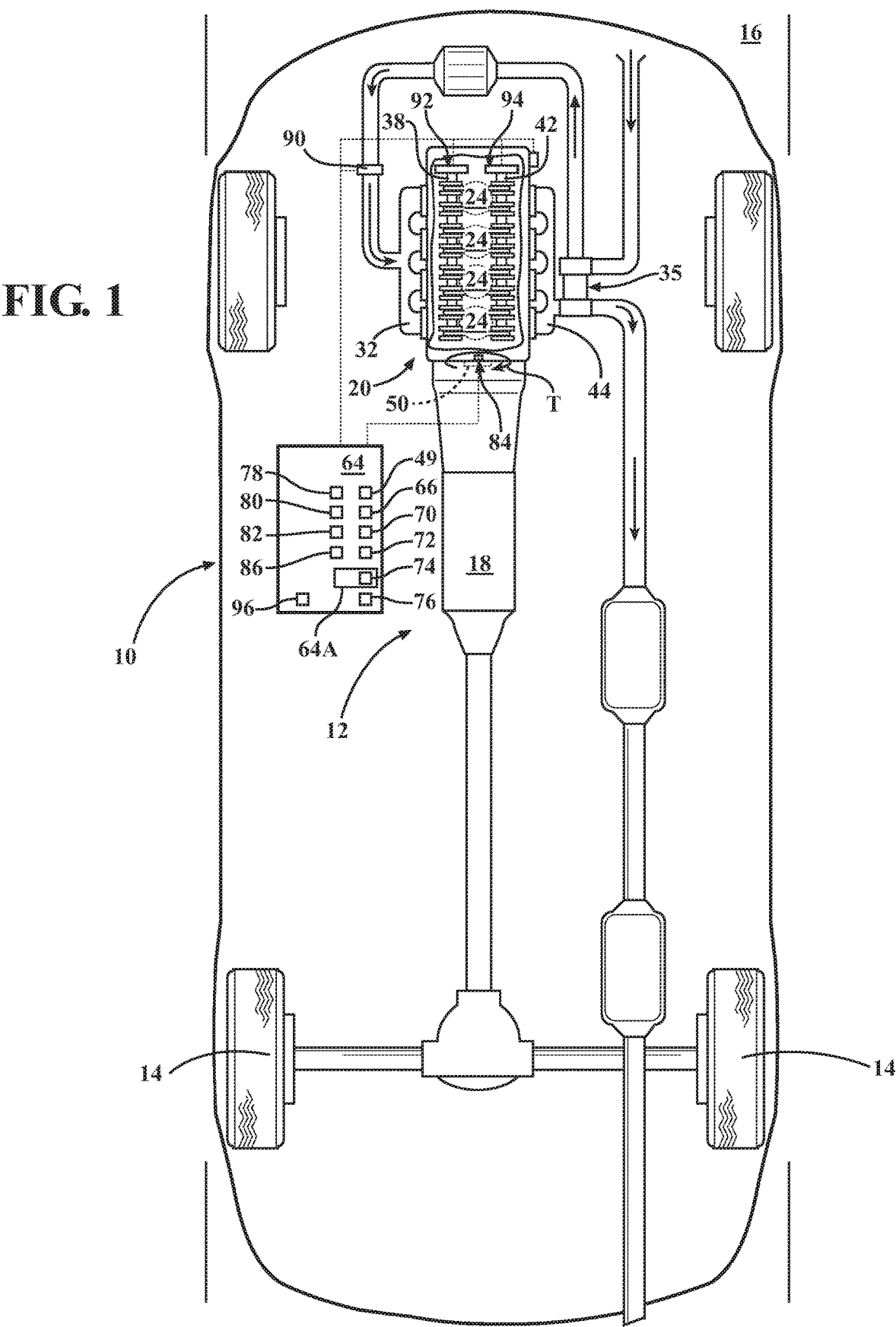
FIG. 1 is a schematic depiction of a vehicle having a variable compression ratio (VCR) engine and an electronic controller configured to regulate operation of the VCR engine, according to the disclosure.

Referring to the drawings, wherein like reference numbers correspond to like or similar components throughout the several figures, FIG. 1 illustrates a vehicle 10 employing a powertrain 12 for propulsion thereof via driven or road wheel(s) 14 relative to a road surface 16. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. As shown in FIG. 1, the powertrain 12 includes a transmission assembly 18 operatively connected to an internal combustion engine 20, wherein the engine generates output torque T and the transmission transfers the engine torque to the driven wheel(s) 14.

Figure 2:
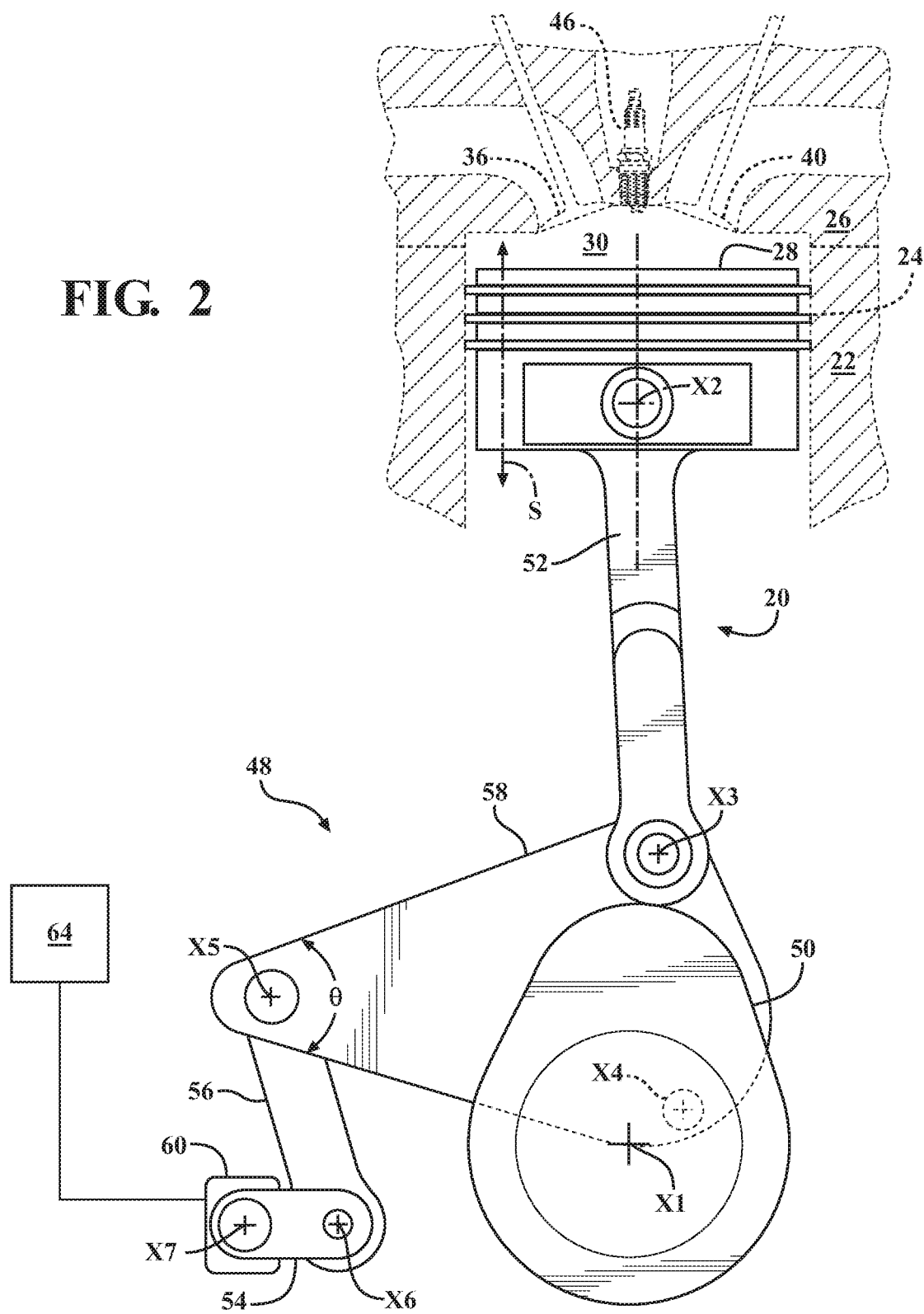
FIG. 2 is a schematic cross-sectional illustration of the engine shown in FIG. 1, the VCR engine having reciprocating piston(s) and a six-bar linkage mechanism including primary and control crankshafts configured to continuously vary the stroke of the piston(s) and the compression ratio of the engine and depicting a phasing actuator configured to regulate a position of the control crankshaft.
Figure 3:
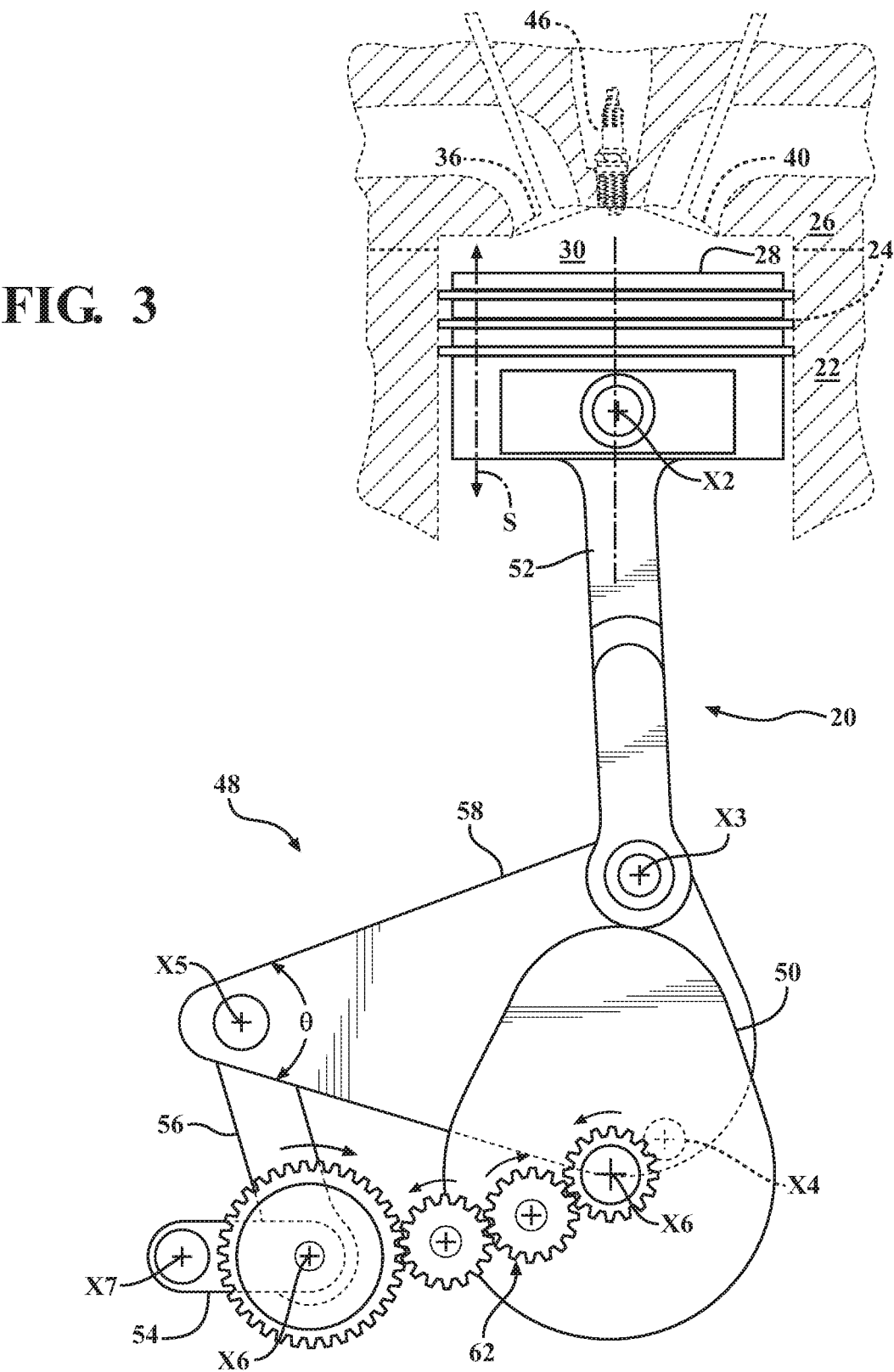
FIG. 3 is a schematic cross-sectional illustration of the VCR engine shown in FIG. 1 and depicting a torque-transfer mechanism configured to operatively connect the control crankshaft to the primary crankshaft, according to one embodiment of the disclosure.
Figure 4:
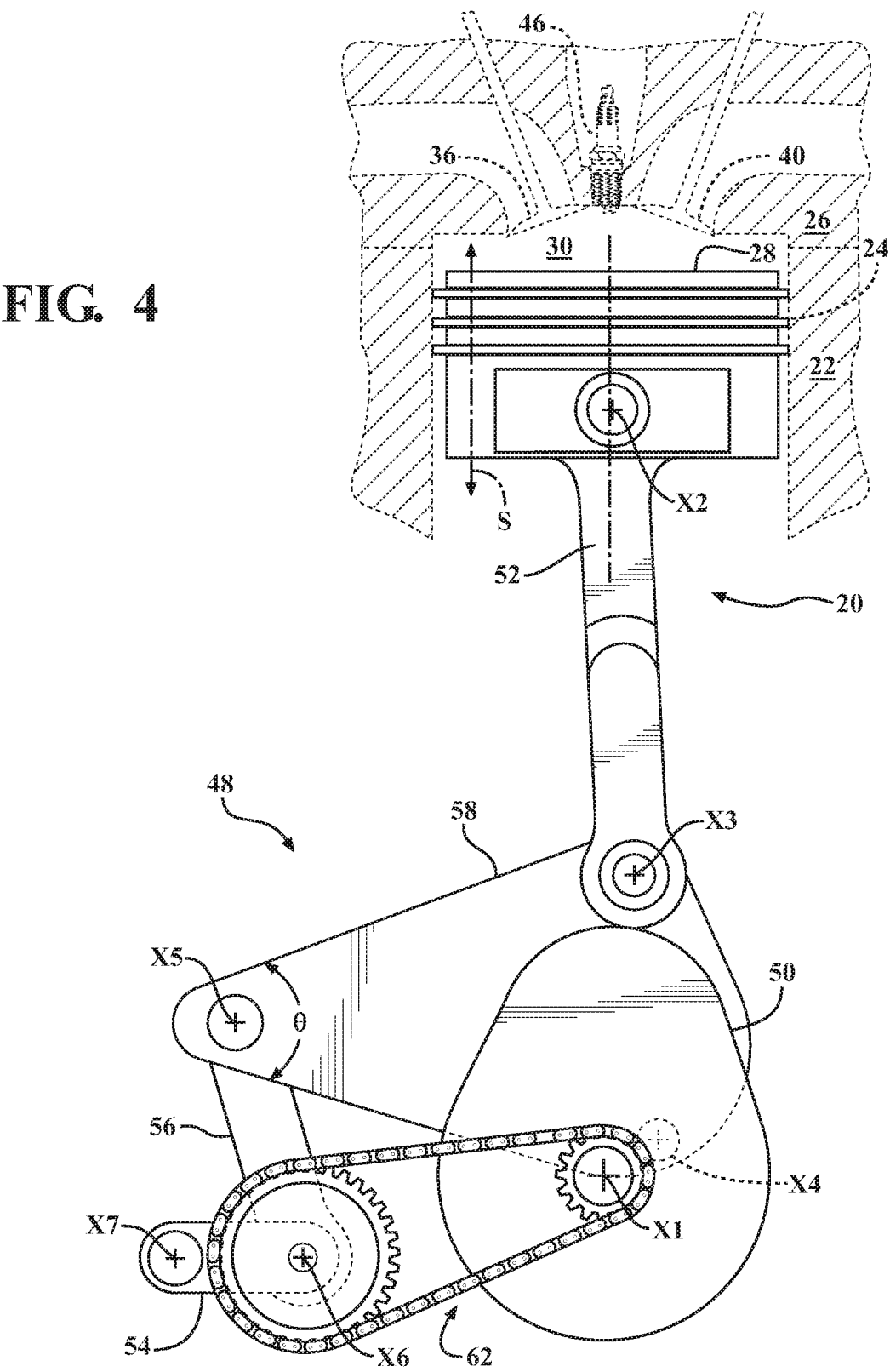
FIG. 4 is a schematic cross-sectional illustration of the VCR engine shown in FIG. 1 and depicting a torque-transfer mechanism configured to operatively connect the control crankshaft to the primary crankshaft, according to another embodiment of the disclosure.

The internal combustion engine 20 is specifically configured as a variable compression ratio (VCR) engine, and may be a spark- or compression-ignition type, as understood in the art. The engine 20 may be further configured as a 4-stroke engine. Accordingly, operation of the engine 20 may define individual and separate intake stroke, expansion stroke, compression stroke, and exhaust stroke. During such 4-stroke operation, the engine 20 typically requires 720 degrees or two complete revolutions to complete a single combustion cycle. As shown in FIGS. 2-4, the engine 20 includes an engine block 22. The engine block defines cylinders 24, each arranged along a respective cylinder centerline CL. A cylinder head 26 is mounted, such as fastened, to the engine block 22. In the alternative, the cylinder head 26 may be integrated into or cast together with the engine block 22 (not shown). The cylinder head 26 receives air and fuel as a pre-combustion charge to be used inside the cylinders 24 for subsequent combustion.

As may be seen in FIGS. 2-4, each cylinder 24 includes a respective power-generating piston 28 configured to reciprocate therein. Additionally, combustion chambers 30 are formed within the cylinders 24 between the bottom surface of the cylinder head 26 and the tops of the pistons 28. Accordingly, the cylinder head 26 defines at least a part of the combustion chambers 30. A stroke S of the piston(s) 28 together with the volume remaining in the combustion chamber 30 at top dead center (TDC) of the stroke defines a compression ratio CR of the engine 20. In other words, the compression ratio CR of the engine 20 is the ratio between the volume of the cylinder 24 and the combustion chamber 30 when the piston 28 is at the bottom of its stroke S, and the volume of the combustion chamber 30 when the piston is at the top of its stroke.

A flow of air from the ambient is directed through an intake manifold 32 to each of the combustion chambers 30. Ambient air is combined either in the intake manifold 32 or inside the combustion chambers 30 with an appropriately metered amount of fuel, generally introduced by a fuel injector 34, to form a fuel-air mixture for subsequent combustion inside the subject combustion chamber. Also, an intake air compressor 35, such as a turbocharger or a supercharger, may be employed to increase pressure of the ambient air charge to enhance output engine torque T. Although an in-line four-cylinder engine is shown in FIGS. 1-2, nothing precludes the present disclosure from being applied to an engine having a different number and/or arrangement of cylinders.

As shown on FIGS. 2-4, the engine 20 also includes one or more intake valves 36 operatively connected to the cylinder head 26 and configured to control a supply of intake air to each cylinder 24 for combustion with fuel therein. An intake camshaft 38 may be employed to regulate opening and closing of the respective intake valve(s) 36 during operation of the engine 20. The engine 20 additionally includes one or more exhaust valves 40 operatively connected to the cylinder head 26 and configured to control removal of post-combustion gasses from each cylinder 24. An exhaust camshaft 42 may be employed to regulate opening and closing of the respective exhaust valves 40 during operation of the engine 20.

The cylinder head 26 is also configured to exhaust post-combustion gasses from the combustion chambers 30, such as via an exhaust manifold 44. As shown in FIGS. 2-4, the engine 20 may employ spark plugs 46, i.e., at least a part of each spark plug may be arranged inside a respective combustion chamber 30 and configured to ignite the mixture of air and fuel for initiating combustion thereof. Specifically, there may be a plurality, for example two, spark plugs 46 employed by each respective combustion chamber 30. If the engine 20 is configured as a compression-ignition type, the cylinders 24 may be devoid of such spark plugs, since the combustion of the fuel-air mixture may be initiated solely via compression thereof.

The engine 20 also includes a mechanism 48 configured to vary the engine's compression ratio CR regardless of engine speed S. In other words, position 49 of the mechanism 48 defines the engine's compression ratio CR. For example, the mechanism 48 may include a six-bar linkage 48A configured to operatively connect the piston 28 to the engine block 22 and articulate on seven distinct parallel axes that will be described in detail below. The six-bar linkage 48A may also be employed to decouple the compression stroke of the engine 20 from its expansion stroke, i.e., such that the length of the compression stroke does not establish or have to be identical to the length of the expansion stroke. As a result, each of the expansion and compression strokes of the engine 20 may be regulated individually, and without influencing the duration of the other. The six-bar linkage 48A may be employed to continuously and selectively vary the volume of the combustion chamber(s) 30 at the TDC position and thereby vary the compression ratio CR of the engine 20, as well as the compression stroke and the expansion stroke of the piston(s) 28. In some embodiments, operation of the mechanism 48 may be correlated to engine 20 operating conditions, such as torque and speed.

As shown, the six-bar linkage 48A may include a primary crankshaft 50 rotatably mounted to the engine block 22. The primary crankshaft 50 is configured to be rotated within the engine block 22 about a first axis X1 (defining the engine speed) via the combustion force received by the piston(s) 28 and outputting the engine torque T, such as to the transmission 18. The six-bar linkage 48A may also include a connecting rod 52 pivotably connected to the piston 28 at a second axis X2. The six-bar linkage 48A may additionally include a multi-bar link 54 rotatably connected to the connecting rod 52 at a third axis X3 and to the primary crankshaft 50 at a fourth axis X4. Specifically, the multi-bar link 54 is shown as a generally triangular structure defining a unified twin-link member, such that the motion of the two links is fully synchronized. In the embodiment shown, an included angle $\theta$ of the triangular multi-bar link 54 is configured to define the spacial relationship between the first, third, and fifth axes X1, X3, X5, and, in part, an available range of adjustment for the stroke S of the piston(s) 28.

The six-bar linkage 48A may also include a control link 56 pivotably connected to the multi-bar link 54 at a fifth axis X5. The six-bar linkage 48A may further include a control crankshaft 58 arranged in the engine block 22, connected to the control link 56 at a sixth axis X6, and configured to rotate about a seventh axis X7. The lengths of the control link 56 and the control crankshaft 58 are additional factors influencing the available range of adjustment for the stroke S of the piston(s) 28. As a result, the control crankshaft 58 may be configured such that adjusting, via rotating or repositioning, the control crankshaft relative to the engine block 22 regulates the volume of the combustion chamber(s) 30 at the TDC position to vary the compression ratio CR.

Effectively, the six-bar linkage 48A enables the adjustment of either one or both of the TDC and bottom dead center (BDC) positions of the piston 28 along its stroke S. Accordingly, continuous adjustment of the position of control crankshaft 58 may be used to continuously and selectively vary the compression stroke and the compression ratio CR of the engine 20. Furthermore, rotating or repositioning the control crankshaft 58 may also be used to control, either vary or maintain, the expansion stroke of the piston(s) 28. As a result, the six-bar linkage 48A may be configured to lengthen the expansion stroke relative to the compression stroke of the piston(s) 28, such that the expansion stroke becomes greater than the compression stroke. The relatively greater expansion stroke, as compared to the compression stroke, is intended to enhance efficiency of the engine 20 by operating the engine on the Atkinson cycle.

In a particular embodiment of the engine 20 shown in FIG. 2, rotation of the primary crankshaft 50 and the control crankshaft 58 may be unsynchronized, thus permitting operational variation or phasing between positioning of the primary crankshaft and the control crankshaft. As shown in FIG. 2, in such an embodiment, the engine 20 may include a phasing actuator 60 configured to shift a position of the six-bar linkage 48A relative to the engine block 22, and thereby select the position 49 of the mechanism 48. The phasing actuator 60 may be specifically configured to select the position of the control crankshaft 58 relative to the primary crankshaft 50, and thereby regulate a position of the fifth axis X5 relative to the seventh axis X7, and of the third axis X3 relative to the first axis X1. The subject regulation of position of the control crankshaft 58 via the phasing actuator 60 may be employed to achieve 4-stroke operation over one complete engine revolution, or within 360 degrees of operation of the engine 20. Accordingly, employing the phasing actuator 60 as shown in FIG. 2 permits the 4-stroke engine 20 to achieve power density of a 2-stroke cycle. Specifically, the phasing actuator 60 may be configured as a stepper motor to regulate the position of the control crankshaft 58 relative to the primary crankshaft 50. The phasing actuator 60 may be mounted to the engine block 22, on the side of the primary crankshaft 50 (as shown in FIG. 2), or below the primary crankshaft (not shown), such as inside a crankcase of the engine 20.

In a separate embodiment of the engine 20 shown in FIG. 3-4, rotation of the primary crankshaft 50 and the control crankshaft 58 may be synchronized. In such an embodiment, the engine 20 may include a torque-transfer mechanism 62 configured to operatively connect the control crankshaft 58 to the primary crankshaft 50, for synchronized operation therebetween. The torque-transfer mechanism 62 may be configured as a gear-train (shown in FIG. 3) or a chain engaging respective sprockets on the primary and control crankshafts 50, 58 (shown in FIG. 4). The configuration of the gear-train can vary and, as such, the control crankshaft 58 may co-rotate or counter-rotate with the primary crankshaft 50, while still achieving desired motion characteristics of the piston 28.

Operation of the engine 20 is regulated via an electronic controller 64. The controller 64 may be an electronic control module (ECM) dedicated to operating the engine 20 or a powertrain controller situated in the vehicle 10 and configured to regulate operation of the powertrain 12. The electronic controller 64 includes a memory 64A, at least some of which is tangible and non-transitory. The memory 64A may be a recordable medium that participates in providing computer-readable data or process instructions. Such a medium may take many forms, including but not limited to non-volatile media and volatile media. Non-volatile media for the controller 64 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer.

The memory 64A may also include a flexible disk or a hard disk, magnetic tape, other magnetic medium, a CD-ROM, DVD, other optical medium, etc. The electronic controller 64 may be configured or equipped with other required computer hardware, such as an internal high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 64 or accessible thereby may be stored in the memory and automatically executed to provide the required functionality.

Specifically, the electronic controller 64 may be configured, i.e., programmed, to receive a request for a specific engine output torque T value 66, such as via an input by an operator of the vehicle 10, for example using an accelerator pedal arranged inside the vehicle's passenger compartment (not shown).

The electronic controller 64 may be additionally programmed to determine specific engine speed value 70 corresponding to the requested output torque T value 66. The controller 64 may also be programmed to determine a specific compression ratio CR value 72 corresponding to the requested output torque T value 66 and the determined engine speed 70. The controller 64 may be further programmed to command the position 49 of the mechanism 48 to thereby select the determined compression ratio CR value 72. A correlation between the engine's compression ratio CR, engine speed, and engine output torque T may be developed empirically, and programmed into the electronic controller 64, for example as a look-up table 74, to be accessed during operation of the engine 20. Accordingly, the electronic controller 64 may be configured to determine the compression ratio CR value 72 via accessing the look-up table 74, such as stored in the memory 64A of the electronic controller.

The controller 64 may be specifically programmed to regulate the phasing actuator 60 to adjust position of the control crankshaft 58, and thus the position of the fifth axis X5 relative to the seventh axis X7, and of the third axis X3 relative to the first axis X1. Accordingly, the controller 64 may be programmed to actively control the engine's compression ratio CR, as well as the expansion stroke relative to the compression stroke of the piston(s) 28. The electronic controller 64 may be additionally configured to determine actual value 76 of the engine's compression ratio CR following the selection of the position 49 of the mechanism 48 to affect the determined compression ratio CR value 72. The electronic controller 64 may be also configured to determine a difference 78 between the determined compression ratio CR value 72 and the actual compression ratio value 76. The electronic controller 64 may be additionally configured to command the phasing actuator 60 to shift the six-bar linkage 48A relative to the engine block 22 to minimize the determined difference 78 between the determined compression ratio value 72 and the actual compression ratio value 76.

The electronic controller 64 may be also configured to determine the difference 78 between the determined compression ratio value 72 and the actual compression ratio value 76 via determining a phase angle 80 of the six-bar linkage 48A relative to the crankshaft 58. The determination of the difference 78 may be additionally determined via determining a rate 82 of shift of the six-bar linkage 48A via the phasing actuator 60 required to achieve the phase angle 80. The electronic controller 64 may be further configured to command the phasing actuator 60 to shift the six-bar linkage 48A relative to the engine block 22 to minimize the determined difference 78 via commanding the determined rate 82 of shift of the six-bar linkage to achieve the determined phase angle 80 and thereby generate the requested output torque T value 66. The six-bar linkage 48A will generally be called upon to shift in a timescale similar to the rate at which the engine 20 is capable of building torque in transient maneuvers.

The vehicle 10 may additionally include a sensor 84 configured to detect output torque T and communicate the detected output torque to the electronic controller 64. The electronic controller 64 may be additionally configured to receive the detected output torque T from the sensor 84 and determine a difference 86 between the detected output torque and the requested output torque value 66. The electronic controller 64 may be further configured to command the phasing actuator 60 to shift the six-bar linkage 48A relative to the engine block 22 to minimize the determined difference 86 between the detected output torque T and the requested output torque value 66.

Particular embodiments of the engine 20 may additionally include a throttle 90 configured to regulate the amount of air admitted into the combustion chamber 30. Additionally, particular embodiments of the engine 20 may include a camshaft phaser 92 configured to vary timing of the intake valves 36 via phasing the intake camshaft 38 and configured to regulate an amount of air admitted into the combustion chamber 30. Furthermore, the engine 20 may include a separate camshaft phaser 94 configured to vary timing of the exhaust valves 40 via the exhaust camshaft 42. Each of the fuel injector 34, spark plug 46, the throttle 90, and the camshaft phasers 92, 94 may be in operative communication with the electronic controller 64.

In such embodiments of the engine 20, the electronic controller 64 may be additionally and generally configured to regulate combustion parameters 96 of the engine, such as the constituents entering the combustion chamber 30. Combustion parameters 96 may be controlled via the electronic controller 64 regulating a position of the throttle 90 configured to vary an amount of air delivered into the combustion chamber 30. Combustion parameters 96 may be also controlled via the electronic controller 64 regulating an amount of boost generated by the air compressor 35, such as via a wastegate (not shown). Combustion parameters 96 may be additionally controlled via the electronic controller 64 regulating a timing of operation of the intake and/or exhaust valves 36, 40 by phasing the respective camshafts, such as via the phasers 92, 94. Combustion parameters 96 may be also controlled via the electronic controller 64 regulating an amount of fuel injected into the combustion chamber via the fuel injector(s) 34. Combustion parameters 96 may be further controlled via the electronic controller 64 regulating a timing of the spark via the spark plug 46.

The electronic controller 64 may be configured to select the determined compression ratio value 72 concurrently, i.e., in parallel, with selecting and regulating at least one of the combustion parameters 96 as part of a model predictive control (MPC) strategy. Thus, selecting the determined compression ratio value 72 either separately from or concurrently with selecting and regulating the combustion parameters 96 as part of a model predictive control (MPC) strategy is intended to permit optimizing the engine's efficiency across a wide operating range. For example, selecting the determined compression ratio value 72 as described above may permit using an elevated compression ratio during low engine speeds and loads to maximize thermal efficiency, while using a reduced compression ratio at high engine speeds and loads to achieve increased power and acceptable fuel efficiency.

In general, MPC is a control strategy employed to optimize each subsequent control step by predicting future behavior of the system based on presently captured data and empirically determined correlation between system parameters indicative of the system's likely behavior. A simplified model of the system being controlled permits prediction of the system's behavior is incorporated into the feedback control loop. Based on the presently captured data and the subject model, the system's processor evaluates multiple possible solutions and selects the solution considered to be most likely to optimize the outcome based on priorities and constraints. Consequently, the prediction and optimization is accomplished at each control step of the approach. One of the advantages of MPC is the concurrent optimization of multiple inputs and outputs, while considering a wide range of priorities and constraints.

With respect to controlling the engine 20, MPC may include generating a torque request, such as the output torque T value 66, based on operator input and identifying a plurality of sets of possible target values of combustion parameters 96 based on the torque T value 66. Each of the sets of possible combustion parameter 96 target values may include, for example, a possible target effective position of the mechanism 48 corresponding to a specific compression ratio CR. MPC may then be used to determine a predicted set of operating parameters for each set of possible target combustion parameter 96 values based on their relationship to and impact on each other and on the engine output torque T.

MPC may be additionally used to determine cost or weight values for each set of possible target combustion parameter 96 values in an iterative control loop, based on the predicted set of operating constraints for each set of possible target combustion parameter 96 values. MPC may be further used to select one of the plurality of sets of possible target combustion parameter 96 values based on the cost values and select a set of target values based on the selected set of possible target values, wherein the set of target values includes, for example, the target effective position of the mechanism 48. Accordingly, determining the target effective position of the mechanism 48 via MPC may be based on the possible target effective position of the mechanism 48, and the requested output torque T value 66 may be achieved by selecting the position of the mechanism 48 based on the target position of the mechanism 48 to affect the determined compression ratio CR value 72.

Figure 5:
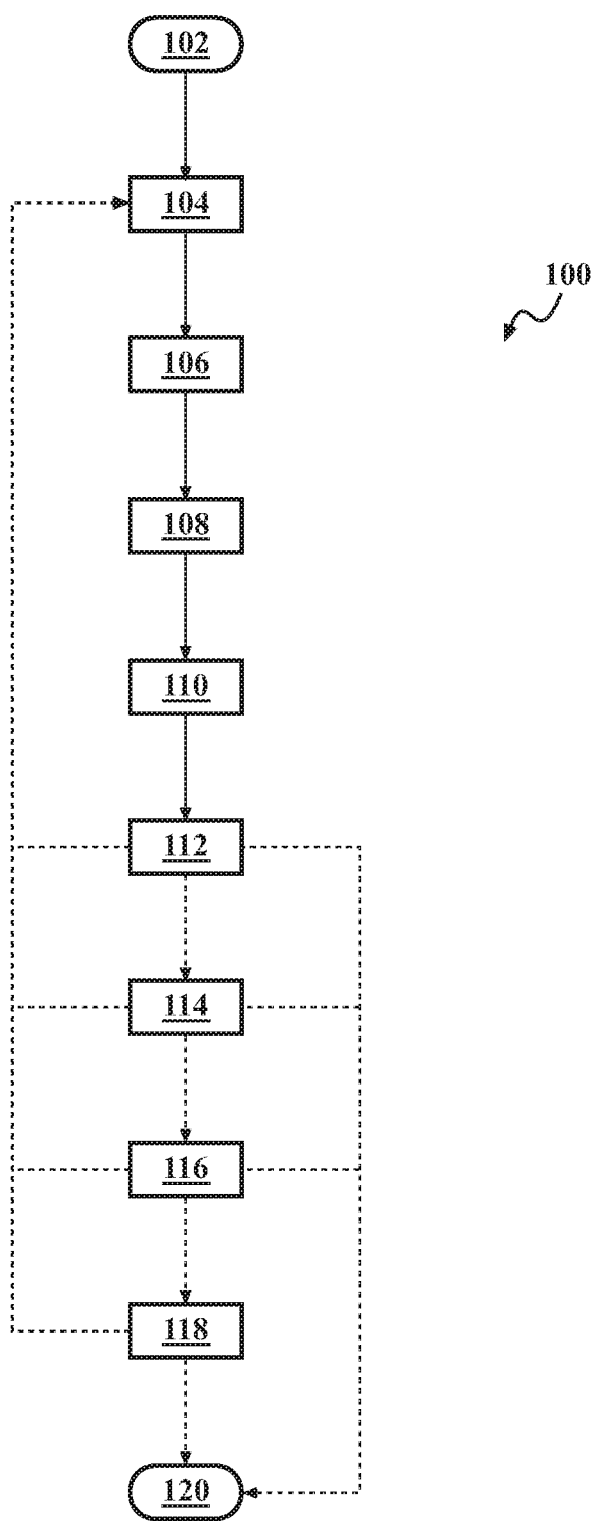
FIG. 5 is a flow diagram of a method of selecting a compression ratio in an internal combustion engine having a mechanism configured to vary the compression ratio as shown in FIGS. 1-4, according to the present disclosure.

FIG. 5 depicts a method 100 of selecting a compression ratio in the VCR engine 20 using the mechanism 48 as described above with respect to FIGS. 1-4. The method 100 initiates in frame 102 with the engine 20 operational and generating torque T, such as in the vehicle 10. Following frame 102, the method proceeds to frame 104. In frame 104 the method includes receiving, via the electronic controller 64, the requested output torque T value 66. After frame 104 the method advances to frame 106. In frame 106 the method includes determining, via the electronic controller 64, the value 70 of the engine speed corresponding to the requested output torque T value 66. Following frame 106, the method moves on to frame 108.

In frame 108, the method includes determining, via the electronic controller 64, a compression ratio value 72 corresponding to the requested output torque T value 66 and the determined value 70 of the engine speed. Determining the compression ratio value 72 may include accessing the look-up table 74 via the electronic controller 64, as described above with respect to FIGS. 1-4. After frame 108, the method proceeds to frame 110. In frame 110 the method includes determining, via the electronic controller 64, the position 49 of the mechanism 48 corresponding to the determined compression ratio value 72. Following frame 110, the method advances to frame 112. In frame 112 the method includes commanding, via the controller 64, the determined position 49 of the mechanism 48 and thereby selecting the determined compression ratio value 72.

In a specific embodiment of the engine 20 described above with respect to FIGS. 1-4, commanding the position 49 of the mechanism 48 and selecting the determined compression ratio value 72 in frame 112 may include shifting position of the six-bar linkage 48A relative to the engine block 22. Shifting the position of the six-bar linkage 48A may be accomplished via the phasing actuator 60. Selecting the determined compression ratio value 72 may be accomplished concurrently with regulating at least one of the combustion parameters 96 of the engine 20 as part of the MPC strategy described above with respect to FIGS. 1-4. Following frame 112, the method may advance to frame 114.

In frame 114 the method includes determining, via the electronic controller 64, an actual compression ratio value 76 following selecting of the position 49 of the mechanism 48 to affect the determined compression ratio value 72. After frame 114, the method may proceed to frame 116. In frame 116 the method includes determining, via the electronic controller 64, a difference 78 between the determined compression ratio value 72 and the actual compression ratio value 76. Determining the difference 78 may include determining the phase angle 80 of the six-bar linkage 48A relative to the crankshaft 58, and determining the rate 82 of shift of the six-bar linkage 48A via the phasing actuator 60 required to achieve the phase angle 80. Following frame 116, the method may advance to frame 118.

In frame 118 the method may include commanding, via the electronic controller 64, the phasing actuator 60 to shift the six-bar linkage 48A relative to the engine block 22 to minimize the determined difference 78 between the determined compression ratio value 72 and the actual compression ratio value 76. Commanding the phasing actuator 60 to thus shift the six-bar linkage 48A relative to the engine block 22 to minimize the determined difference 78 may include commanding the determined rate 82 of shift of the six-bar linkage 48A to achieve the determined phase angle 80 and thereby generate the requested output torque T value 66. Following frame 112, after commanding the determined position 49 of the mechanism 48 and selecting the determined compression ratio value 72, or following each of the frames 114-118, the method may loop back to frame 104. Alternatively, following either frame 112 or each of frames 114-118, the method may conclude in frame 120.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of selecting a compression ratio in an internal combustion engine including a mechanism having a phasing actuator configured to shift a six-bar and vary the compression ratio, the method comprising:

receiving, via an electronic controller, a requested output torque value;

determining, via the electronic controller, a value of engine speed corresponding to the requested output torque value;

determining, via the electronic controller, a compression ratio value corresponding to the requested output torque value and the determined value of the engine speed;

determining, via the electronic controller, a position of the mechanism corresponding to the determined compression ratio value;

commanding, via the electronic controller, the determined position of the mechanism and thereby selecting the determined compression ratio value;

detecting output torque via a sensor and communicating the detected output torque to the electronic controller;

determining, via the electronic controller, a difference between the detected output torque and the requested output torque value; and commanding, via the electronic controller, the phasing actuator to shift the six-bar linkage relative to the engine block to minimize the determined difference between the detected output torque and the requested output torque value.

2. The method according to claim 1, wherein determining the compression ratio value corresponding to the requested output torque value and the determined value of the engine speed includes accessing a look-up table via the electronic controller.

3. The method according to claim 1, wherein the engine additionally includes:
an engine block defining a cylinder;
a cylinder head mounted to the engine block and defining at least a part of a combustion chamber; and
a reciprocating piston arranged inside the cylinder and configured to compress a mixture of air and fuel and receive a combustion force, wherein the compression stroke of the piston defines the compression ratio of the engine;
wherein the six bar linkage is configured to operatively connect the piston to the engine block, articulate on seven distinct parallel axes and continuously and selectively vary the compression ratio of the engine; and
wherein commanding the position of the mechanism and selecting the determined compression ratio value includes shifting position of the six-bar linkage relative to the engine block.

4. The method according to claim 3, further comprising determining, via the electronic controller, an actual compression ratio value following selecting of the position of the mechanism to affect the determined compression ratio value.

5. The method according to claim 4, further comprising:
determining, via the electronic controller, a difference between the determined compression ratio value and the actual compression ratio value; and
commanding, via the electronic controller, the phasing actuator to shift the six-bar linkage relative to the engine block to minimize the determined difference between the determined compression ratio value and the actual compression ratio value.

6. The method according to claim 5, wherein determining the difference between the determined compression ratio value and the actual compression ratio value includes:
determining a phase angle of the six-bar linkage relative to the crankshaft; and determining a rate of shift of the six-bar linkage via the phasing actuator required to achieve the phase angle; and commanding the phasing actuator to shift the six-bar linkage relative to the engine block to minimize the determined difference includes commanding the determined rate of shift of the six-bar linkage to achieve the determined phase angle and thereby generate the requested output torque value.

7. The method according to claim 3, wherein the engine additionally includes at least one of a throttle configured to regulate an amount of air admitted into the engine, an intake air compressor, an intake valve operated via a camshaft and configured to regulate an amount of air admitted into the combustion chamber, a fuel injector, and a spark plug configured to generate a spark to initiate combustion inside the combustion chamber, the method further comprising regulating, via the electronic controller, at least one corresponding combustion parameter of the engine selected from a list including:
a position of the throttle;
an amount of boost generated by the air compressor;
a timing of operation of the intake valve by phasing the camshaft;
an amount of fuel injected into the combustion chamber by the fuel injector; and
a timing of the spark generated by the spark plug.

8. The method according to claim 7, wherein selecting the determined compression ratio value is accomplished concurrently with regulating the combustion parameters of the engine as part of a model predictive control (MPC) strategy.

9. A vehicle comprising:
a road wheel;
a variable compression ratio (VCR) internal combustion engine configured to generate output torque for driving the road wheel, the engine having a mechanism having a phasing actuator configured to shift a six-bar linkage and vary a compression ratio of the VCR engine;
a sensor configured to detect output torque; and
an electronic controller in communication with the sensor and configured to regulate operation of the VCR engine via:
receiving a requested output torque value;
determining a value of engine speed corresponding to the requested output torque value;
determining a compression ratio value corresponding to the requested output torque value and the determined value of the engine speed;
determining a position of the mechanism corresponding to the determined compression ratio value;
commanding the determined position of the mechanism and thereby selecting the determined compression ratio value;
receiving the detected output torque from the sensor;
determining a difference between the detected output torque and the requested output torque value; and
commanding the phasing actuator to shift the six-bar linkage relative to the engine block to minimize the determined difference between the detected output torque and the requested output torque value.

10. The vehicle according to claim 9, wherein the electronic controller is configured to determine the compression ratio value corresponding to the requested output torque value and the determined speed of the engine via accessing a look-up table via the electronic controller.

11. The vehicle according to claim 9, wherein the engine additionally includes:
an engine block defining a cylinder;
a cylinder head mounted to the engine block and defining at least a part of a combustion chamber; and
a reciprocating piston arranged inside the cylinder and configured to compress a mixture of air and fuel and receive a combustion force, wherein the compression stroke of the piston defines the compression ratio of the engine;
wherein the six-bar linkage is configured to operatively connect the piston to the engine block, articulate on seven distinct parallel axes, and continuously and selectively vary the compression ratio of the engine; and
wherein the electronic controller is additionally configured to command the position of the mechanism and select the determined compression ratio value via commanding a shift of a position of the six-bar linkage relative to the engine block.

12. The vehicle according to claim 11, wherein the electronic controller is additionally configured to determine an actual compression ratio value following the selection of the position of the mechanism to affect the determined compression ratio value.

13. The vehicle according to claim 12, wherein the electronic controller is additionally configured to:
determine a difference between the determined compression ratio value and the actual compression ratio value; and
command the phasing actuator to shift the six-bar linkage relative to the engine block to minimize the determined difference between the determined compression ratio value and the actual compression ratio value.

14. The vehicle according to claim 13, wherein the electronic controller is configured to determine the difference between the determined compression ratio value and the actual compression ratio value via:
determining a phase angle of the six-bar linkage relative to the crankshaft; and
determining a rate of shift of the six-bar linkage via the phasing actuator required to achieve the phase angle; and
wherein the electronic controller is configured to command the phasing actuator to shift the six-bar linkage relative to the engine block to minimize the determined difference via commanding the determined rate of shift of the six-bar linkage to achieve the determined phase angle and thereby generate the requested output torque value.

15. The vehicle according to claim 11, wherein the engine additionally includes at least one of a throttle configured to regulate an amount of air admitted into the engine, an intake air compressor, an intake valve operated via a camshaft and configured to regulate an amount of air admitted into the combustion chamber, a fuel injector, and a spark plug configured to generate a spark to initiate combustion inside the combustion chamber, and wherein the electronic controller is additionally configured to regulate at least one corresponding combustion parameter of the engine selected from a list including:
an amount of fuel injected into the combustion chamber;
a timing of the spark;
a position of the throttle; and
a timing of operation of the intake valve by phasing the camshaft.

16. The vehicle according to claim 15, wherein the electronic controller is configured to select the determined compression ratio value concurrently with regulating the combustion parameters of the engine as part of a model predictive control (MPC) strategy.

* * * * *